United States Patent [19]
Laurent et al.

[11] 3,875,194
[45] Apr. 1, 1975

[54] PROCESS FOR THE PREPARATION OF PREGNANOIC ACID DERIVATIVES
[75] Inventors: Henry Laurent; Rudolf Wiechert, both of Berlin, Germany
[73] Assignee: Schering Aktiengesellschaft, Berlin and Bergkamen, Germany
[22] Filed: Dec. 5, 1973
[21] Appl. No.: 421,820

[30] Foreign Application Priority Data
Dec. 6, 1972   Germany............................. 2260303

[52] U.S. Cl.......................... 260/397.1, 260/397.45
[51] Int. Cl.......................................... C07c 167/18
[58] Field of Search................................ 260/397.1

Primary Examiner—Elbert L. Roberts
Attorney, Agent, or Firm—Millen, Raptes & White

[57] ABSTRACT
Topical anti-inflammatory pregnanoic acid derivatives of the formula

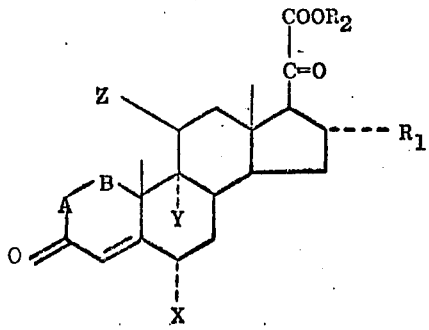

wherein —A—B— is —CH$_2$—CH$_2$—, —CH=CH—, or —CCl=CH—; X is a hydrogen atom, a halogen atom, or methyl; Y is a hydrogen atom or a halogen atom; Z is a hydroxy or a halogen atom having an atomic weight the same as or lower than Y; R$_1$ is a hydrogen atom or methyl; and R$_2$ is hydrocarbon, are produced in two steps by first converting a 21-hydroxy steroid of the formula

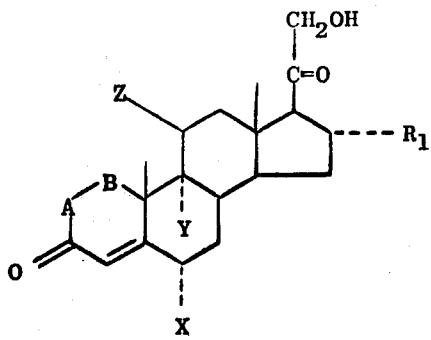

wherein —A—B, X, Y, Z, and R$_1$ have the values given above, into the corresponding 20-keto-21-aldehyde, or hydrate or hemiacetal thereof, with an alcohol in the presence of a copper (II) salt, and then converting the thus-produced steriod, with an oxidizing heavy metal oxide in the presence of an alcohol and cyanide ions, into the pregnanoic acid derivative.

17 Claims, No Drawings

PROCESS FOR THE PREPARATION OF PREGNANOIC ACID DERIVATIVES

BACKGROUND OF THE INVENTION

This invention relates to a process for the preparation of pregnanoic acid derivatives of the general Formula I

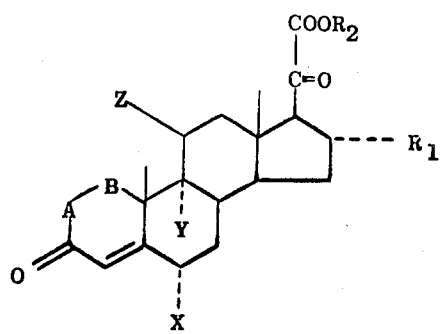

wherein —A—B— is —$CH_2$—$CH_2$—, —CH=CH—, or —CCl=CH—; X is a hydrogen atom, a halogen atom, or methyl; Y is a hydrogen atom or a halogen atom; Z is a hydroxy or a halogen atom having an atomic weight the same as or lower than Y; $R_1$ is a hydrogen atom or methyl; and $R_2$ is hydrocarbon.

The pregnanoic acid derivatives of general Formula I have been described in United States Application Ser. No. 284,710 filed Aug. 30, 1972, the disclosure of which is incorporated by reference, and German Pat. Application p 21 50 268.1. As also disclosed in these patent applications, these pregnanoic acid derivatives possess topical antiinflammatory activity and can be produced from 21-hydroxy steroid of the general Formula II

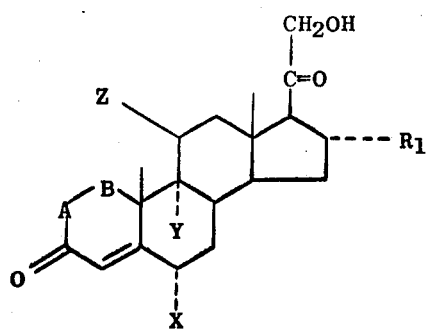

wherein —A—B—, X, Y, Z, and $R_1$ have the values given for Formula I, by converting the latter into pregnanoic derivatives of the general Formula III

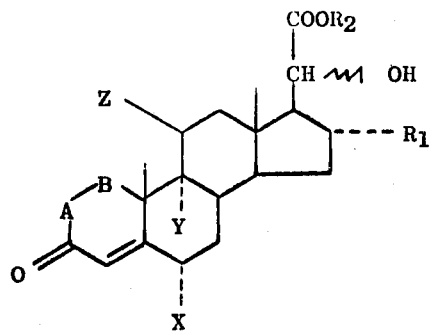

wherein —A—B—, X, Y, Z, $R_1$, and $R_2$ have the above-indicated meanings and the 20-hydroxy group is in the α- or β-position, and then converting these compounds by oxidation of the 20-hydroxy group into pregnanoic acid derivatives of general Formula I.

Compared to the process described in German Pat. Application No. p 21 50 268.1, the two-step process of this invention represents a considerable advance in the art, inasmuch as it is possible with the aid thereof to surprisingly obtain in an essentially shorter period of time substantially higher yields. According to the method of the present invention, a reaction time of maximally two hours is normally required for each of the two reaction steps, if the reactions are conducted at room temperature. In contrast thereto, several days are necessary for the first reaction step alone of the process of the above-identified patent applications, if conducted at room temperature. With the aid of the process of this invention, yields of between 60% and 75% of theory are normally obtained, considering both reaction steps; even in unfavorable cases, yields are approximately 50% of theory. In contrast thereto, over-all yields obtained in the process of Ser. No. 284,710 and German Pat. Application No. p 21 50 268.1, considering both stages together, are normally 10% to 30% of theory.

SUMMARY OF THE INVENTION

According to this invention, a 21-hydroxy steroid of the general Formula II is converted, by reaction with an alcohol in the presence of a copper (II) salt, into a steroid aldehyde of the general Formula IV

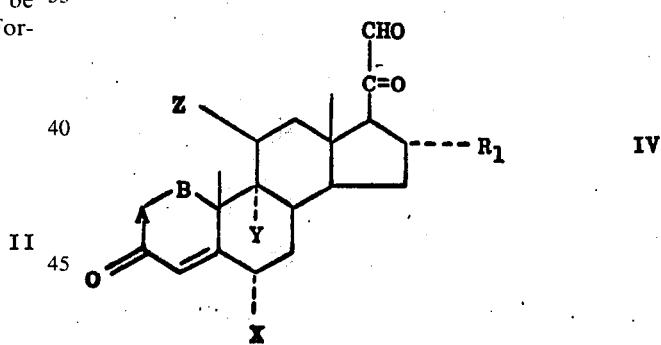

wherein —A—B—, X, Y, Z, and $R_1$ have the same meanings as set forth in Formula I, or a hydrate or hemiacetal thereof, which is then oxidized with an oxidizing heavy metal oxide in the presence of an alcohol and cyanide ions into a pregnanoic acid derivative.

DETAILED DISCUSSION

Of the starting compounds of Formula I, preferred sub-classes are those wherein:

I*a*. $R_2$ is alkyl of 1–12 carbon atoms, preferably 1–8 carbon atoms;
I*b*. X is fluoro, especially those of I*a*;
I*c*. Y is hydrogen, especially those of I*a* and I*b*;
I*d*. Z is hydroxy, especially those of I*a*, I*b* and I*c*;
I*e*. —A—B— is —CH=CH—, especially those of I*a*, I*b*, I*c* and I*d*;

If $R_1$ is methyl, especially those of Ia, Ib, Ic, Id and Ie.

When X, Y or Z is a halogen atom, it preferably is fluorine or chlorine.

Because activity resides in the pregnanoic acid steroidal structure, —COOR$_2$ can represent any ester group.

For example, in the process of this invention, $R_2$ can be any hydrocarbon group derived from a reaction alcohol of 1–16, preferably 1–12, carbon atoms. The hydrocarbon group can be aliphatic, e.g., alkyl, or cycloaliphatic, preferably monocyclic or aralkyl.

Examples of aliphatic $R_2$ groups are straight and branched chain alkyl of 1–12, preferably 1–8, more preferably 1–4 carbon atoms, e.g., methyl, ethyl, propyl, isopropyl, n-butyl, sec.-butyl, tert.-butyl, amyl, isoamyl, tert.-amyl, hexyl, heptyl, octyl, decyl, dodecyl, tetradecyl and hexadecyl.

Examples of cycloalkyl are those containing 3–12, preferably 5 or 6 ring carbon atoms, e.g., cyclopropyl, cyclopentyl, cyclohexyl, cyclohexyl methyl, cyclopentenyl, cyclopentadienyl and p-dicyclohexyl.

Examples of aryl are mono and dicyclic of up to 12 carbon atoms, e.g., phenyl, α-naphthyl and β-naphthyl and p-diphenyl.

Examples of alkaryl are tolyl, xylyl, ethylphenyl and sym-diethylphenyl. Examples of aralkyl are benzyl, phenylethyl and α-phenylpropyl and diphenylmethyl.

It will be apparent to those skilled in the art that equivalents of unsubstituted $R_2$ hydrocarbon groups are hydrocarbon groups bearing 1, 2, 3 or more simple substituents, preferably one, since such substituents ordinarily do not affect the overall activity of the parent pregnanoic acid. Examples of such simple substituents are halo, e.g., Cl or F, NO$_2$, amido, lower-alkoxy, i.e., containing 1–4 carbon atoms, e.g., methoxy, ethoxy, propoxy, butoxy and tert.-butoxy.

The process of this invention is a two-stage procedure. In the first stage, the 21-hydroxy steroids of general Formula II are converted with alcohols, in the presence of copper (II) salts, to the steroid aldehydes of general Formula IV.

Suitable copper (II) salts for the first reaction are water soluble salts of inorganic or organic acids, e.g., copper (II) inorganic mineral acid salts or preferably salts of lower carboxylic acids; copper (II) salts of inorganic acids can also be used. Suitable copper (II) salts include but are not limited to: copper (II) formate, copper (II) acetate, copper (II) propionate or copper (II) butyrate.

Alcohols usable in this first reaction step are alcohols of the general formula R$_2$OH, wherein R$_2$ has the same meanings as in Formula I. Especially preferred alcohols are lower and intermediate, primary or secondary aliphatic alcohols having 1–8 carbon atoms in the alcohol residue. Suitable such alcohols include but are not limited to methanol, ethanol, propanol, isopropanol, butanol, isobutanol, sec.-butanol, amyl alcohol, isoamyl alcohol, hexanol, heptanol or octanol. Excess alcohol can also serve simultaneously as the reaction solvent, although it is of course also possible to admix inert solvents to the reaction mixture in addition to the alcohols. Suitable inert solvents are known in the art and include but are not limited to hydrocarbons, e.g., benzene, cyclohexane or toluene; chlorinated hydrocarbons, e.g., methylene chloride, chloroform or tetrachloroethane; ethers, e.g., diethyl ether, diisopropyl ether, glycol dimethyl ether, tetrahydrofuran or dioxane; dipolar aprotic solvents, e.g., dimethylformamide, N-methyl-acetamide or N-methylpyrrolidone; etc.

The first reaction step is preferably accomplished at a reaction temperature of 0°C to 40°C. The reaction time required for the first reaction step is dependent on the structure of the 21-hydroxy steroid employed and on the reaction temperature, but is generally 5–120 minutes. The optimum reaction period can be determined without difficulty for each individual case by withdrawing aliquots from the reaction mixture at certain time intervals and examining these samples by means of thin-layer chromatography. The optimum reaction time in terms of yield is of course reached when the 21-hydroxy steroid used as the starting material has been completely converted.

Depending on the selection of the specific reaction conditions and on whether aqueous or anhydrous alcohols are utilized for the reaction, the free steroid aldehydes of general Formula IV or the corresponding hydrates, hemiacetals or mixtures thereof are formed during this reaction. The nature of the resultant product is in this aspect unimportant with respect to the subsequent reactions.

The conversion of the steroid aldehydes of general Formula IV into the pregnanoic acid derivatives of general Formula I can in principle be accomplished with the aid of a great variety of oxidizing agents, as has been demonstrated by our experiments.

For example, it is possible to convert the steroid aldehydes to the pregnanoic acid derivatives in the presence of acids with alcohols and organic oxidizing agents, such as 5,6-dichloro-2,3-dicyanobenzoquinone or triphenyltetrazolium chloride. However, this method has the disadvantages that the oxidizing agents employed are very expensive, and that the subsequent purification of the reaction products is complicated.

It is also possible to oxidize the steroid aldehydes with oxidizing metallic oxides or metallic salts, such as manganese oxide, silver oxide, chromic acid, permanganate and similar compounds, in the presence of alcohols and optionally of acids. These reactions, however, take place relatively slowly, and considerable proportions of undesired by-products are formed in addition to the pregnanoic acid derivatives.

It is likewise possible to react the steroid aldehydes with atmospheric oxygen in the presence of alcohols and of cyanide ions. This reaction, though, likewise takes place rather gradually, and undesired by-products are also produced to a considerable extent.

In order to obtain a rapid reaction and high yields, it is advantageous to effect the second reaction step of the process of this invention with oxidizing heavy metal oxides in the presence of alcohols and of cyanide ions. The second process step can be accomplished with the use of the same alcohols and solvents as the first reaction step.

For the second reaction step, suitable heavy metal oxides are those of Groups Ia, IIa, IVa, Va, VIb and VIIb in the lower half of the Periodic Table having an oxidation potential of at least +0.50; suitable such oxides include but are not limited to silver oxide, lead(IV) oxide, minium, vanadium (V) oxide, manganese(IV) oxide or chromium(VI) oxide (the latter compound only if the steroid aldehydes do not have an 11 β-hydroxy oxidizable group). The reaction is conducted preferably by using 0.5 g. to 50 g. and especially 1 g. to 10 g. of heavy metal oxide per gram of steroid aldehyde. The catalyst employed for this reaction step is cyanide ions. Reagents yielding cyanide ions are preferably alkali metal cyanides, e.g., sodium or potassium cyanide. Preferably, 0.01 – 10 moles and particularly 0.1 – 1 mole of cyanide is used per mole of steroid aldehyde. If alkali cyanides are utilized as the reagents yielding cyanide ions, the reaction is suitably conducted by adding to the reaction mixture an alkali neutralizing amount of acid, e.g., mineral acid such as sulfuric acid, phosphoric acid or hydrogen chloride; sulfonic acid such as p-toluenesulfonic acid; or carboxylic acid such as formic acid or acetic acid to maintain the pH at about 2.0 to 6.0.

The reaction is suitably conducted at a reaction temperature of between −20° C and +100°C and preferably at a reaction temperature of between 0° C and +50° C. The duration of the reaction is dependent on the reaction temperature and the selection of the reactants; on the average, this period is 15 minutes to 120 minutes. In the individual case, the optimum reaction time can be readily determined in the same manner as for the first reaction step.

It is surprising to a person skilled in the art that the steroid aldehydes of general Formula IV can be converted rapidly and with the production of high yields into the pregnanoic acid derivatives of general Formula I with the use of oxidizing heavy metal oxides in the presence of cyanide ions and alcohols because steroid aldehydes of the general formula IV are only converted in low yields to pregnanoic acid derivatives of the general formula I when oxidized with heavy metal oxides in alcoholic solution in the absence of cyanide ions.

The following examples serve to explain the process of the present invention.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight. The values obtained in elemental analyses are within commonly accepted limits of error.

EXAMPLE 1 a. 1.0 g. of 6α-fluoro-11β,21-dihydroxy-16α-methyl-1,4-pregnadiene-3,20-dione is dissolved in 125 ml. of methanol, and a solution of 250 mg. of copper (II) acetate in 125 ml. of methanol is added thereto. The mixture is stirred for 15 minutes at room temperature while passing an air stream through the mixture. The latter is then diluted with methylene chloride, washed with 5% ammonium chloride solution and water, dried over sodium sulfate, and the solvent removed by vaporization under vacuum at 40° C. Yield: 1.05 g. of 6α-fluoro-11β-hydroxy-3,20-dioxo-16α-methyl-1,4-pregnadien-21-al as a crude product.

b. The thus-obtained product is dissolved in 50 ml. of butanol, and the solution is stirred for 30 minutes at room temperature after adding 165 mg. of potassium cyanide, 1.0 ml. of acetic acid, and 5 g. of manganese(IV) oxide. The manganese(IV) oxide is removed by filtration, the filtrate is diluted with methylene chloride, washed with water, the organic phase is dried over sodium sulfate, and evaporated to dryness under vacuum. The residue is chromatographed on silica gel. With 12–15% acetone-hexane, 840 mg. of a crude product is eluted which yields, after recrystallization from acetone-hexane, 735 mg. of 6α-fluoro-11β-hydroxy-3,20-dioxo-16α-methyl-1,4-pregnadien-21-oic acid butyl ester; m.p. 195° C.

$[\alpha]_D^{25} = +134°$ (chloroform).

EXAMPLE 2

950 mg. of 6α-flouro-11β-hydroxy-3,20-dioxo-16α-methyl-1,4-pregnadien-21-al is reacted in 20 ml. of methanol under the conditions described in Example 1(b). The crude product is chromatographed on silica gel. With 18–22% acetone-hexane, and after recrystallization from acetone-hexane, 699 mg. of 6α-fluoro-11β-hydroxy-3,20-dioxo-16β-methyl-1,4-pregnadien-21-oic acid methyl ester is obtained; m.p. 197° C.

$[\alpha]_D^{25} = +144°$ (chloroform).

EXAMPLE 3

Under the conditions set forth in Example 1(a), 1.0 g. of 6α-fluoro-11β,21-dihydroxy-16α-methyl-5-pregnene-3,20-dione is oxidized to the 6α-fluoro-11β-hydroxy-3,20-dioxo-16α-methyl-4-pregnen-21-al. The thus-obtained product is converted, under the conditions described in Example 1(b), into the butyl ester of 6α-fluoro-11β-hydroxy-3,20-dioxo-16α-methyl-4-pregnen-21-oic acid. Yield: 596 mg.; m.p. 192° C.

$[\alpha]_D^{25} = +175°$ (chloroform).

EXAMPLE 4

1.0 g. of 6α,9-difluoro-11β,21-dihydroxy-16α-methyl-1,4-pregnadiene-3,20-dione is converted, under the conditions set forth in Example 1, into the butyl ester of 6α,9-difluoro-11β-hydroxy-3,20-dioxo-16α-methyl-1,4-pregnadien-21-oic acid. Yield: 752 mg.; m.p. 194° C.

$[\alpha]_D^{25} = +122°$ (chloroform).

EXAMPLE 5

1.1 g. of 6α-fluoro-11β-hydroxy-3,20-dioxo-16α-methyl-1,4-pregnadien-21-al is converted in isopropanol, under the conditions described in Example 1(b), into the isopropyl ester of 6α-fluoro-11β-hydroxy-3,20-dioxo-16α-methyl-1,4-pregnadien-21-oic acid. Yield: 649 mg.; m.p. 225° C.

$[\alpha]_D^{25} = +134°$ (chloroform).

EXAMPLE 6

Under the conditions set forth in Example 1(a), 1.0 g. of 6α-fluoro-9-chloro-11β,21-dihydroxy-16α-methyl-1,4-pregnadiene-3,20-dione is oxidized to the 21-aldehyde, and the latter is converted, under the conditions indicated in Example 1(b) but in methanol with silver(I) oxide, into the methyl ester of 6α-fluoro-9-chloro-11β-hydroxy-3,20-dioxo-16α-methyl-1,4-pregnadien—21-oic acid. Yield: 605 mg.; m.p. 225° C.

$[\alpha]_D^{20} = +153°$ (dioxane).

EXAMPLE 7

Under the conditions described in Example 1(a), 750 mg. of 6α,11β-difluoro-9-chloro-21-hydroxy-16α-methyl-1,4-pregnadiene-3,20-dione is oxidized to the aldehyde, and the latter is converted, under the conditions set forth in Example 1(b), but in methanol with vanadium(V) oxide, into the methyl ester of 6α,11β- difluoro-9-chloro-3,20-dioxo-16α-methyl-1,4-pregnadien-21-oic acid. Yield: 510 mg.; m.p. 240° C.

$[\alpha]_D^{25} = +138°$ (chloroform).

EXAMPLE 8

Under the conditions described in Example 1(a), 500 mg. of 6α-fluoro-2-chloro-11β,21-dihydroxy-16α-methyl-1,4-pregnadiene-3,20-dione is oxidized to the 21-aldehyde, and the latter is converted, under the conditions indicated in Example 1(b), in propanol into the propyl ester of 6α-fluoro-2-chloro-11β-hydroxy-3,20-dioxo-16α-methyl-1,4-pregnadien-21-oic acid. Yield: 252 mg.; m.p. 165° C.

$[\alpha]_D^{25} = +107°$ (chloroform).

EXAMPLE 9

Under the conditions set forth in Example 1(a), 550 mg. of 9-fluoro-11β,21-dihydroxy-16α-methyl-1,4-pregnadiene-3,20-dione is oxidized to the 21-aldehyde, and the latter is converted, under the conditions described in Example 1(b), in methanol into the methyl ester of 9-fluoro-11β-hydroxy-3,20-dioxo-16α-methyl-1,4-pregnadien-21-oic acid. Yield: 418 mg.; m.p. 215° C.

$[\alpha]_D^{25} = +140°$ (chloroform).

EXAMPLE 10

Under the conditions indicated in Example 1(a), 750 mg. of 11β,21-dihydroxy-1,4-pregnadiene-3,20-dione is oxidized to the 21-aldehyde, and the latter is converted, under the conditions set forth in Example 1(b), in ethanol into the ethyl ester of 11β-hydroxy-3,20-dioxo-1,4-pregnadien-21-oic acid. Yield: 382 mg.; m.p. 190° C.

$[\alpha]_D^{25} = +174°$ (chloroform).

EXAMPLE 11

Under the conditions indicated in Example 1, 1.0 g. of 11β,21-dihydroxy-16α-methyl-1,4-pregnadiene-3,20-dione is converted into the butyl ester of 11β-hydroxy-16α-methyl-3,20-dioxo-16α-methyl-1,4-pregnadien-21-oic acid. Yield: 670 mg.; m.p. 149° C.

$[\alpha]_D^{25} = +153°$ (chloroform).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of pregnanoic acid derivatives of the formula

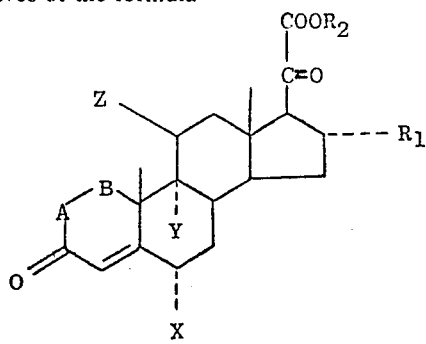

wherein —A—B— is —$CH_2$—$CH_2$—, —CH=CH—, or —CCl=CH; X is hydrogen, halogen or methyl; Y is hydrogen or halogen; Z is hydroxy or a halogen having an atomic weight the same as or lower than Y; $R_1$ is hydrogen atom or methyl; and $R_2$ is alkyl of 1–12 carbon atoms, cycloalkyl of 3–12 ring carbon atoms, mono or dicyclic aryl of up to 12 ring carbon atoms, phenylalkyl or alkylphenyl, which comprises i. reacting a 21-hydroxy steroid of the formula

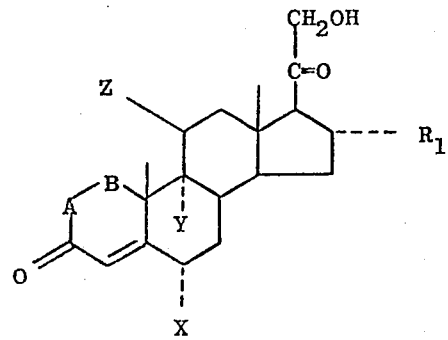

wherein —A—B—, X, Y, Z, and $R_1$ have the values given above, with an alcohol of the formula $R_2OH$ wherein $R_2$ has the values given above, in the presence of a water soluble copper(II) salt of an acid to form the corresponding steroid aldehydes or hydrates or hemiacetals thereof, of the formula

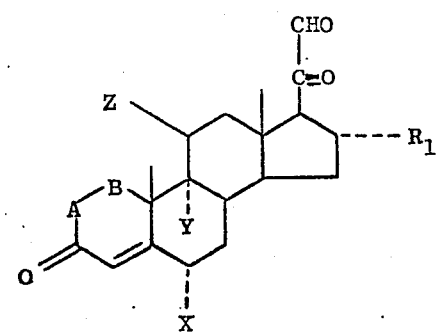

wherein —A—B—, X, Y, Z, and $R_1$ have the above-indicated values, and ii. oxidizing said aldehyde, hydrate or hemiacetal with an oxidizing oxide of a metal of Groups Ia, IIa, IVa, VIb and VIIb in the lower half of the Periodic Table having an oxidation potential of at least + 0.50 in the presence of an alcohol and as catalyst for the oxidation, an alkali metal cyanide, to form the corresponding pregnanoic acid derivative.

2. A process according to claim 1, wherein $R_2$ is alkyl or 1–8 carbon atoms.

3. A process according to claim 1, wherein the copper(II) salt is the salt of a lower carboxylic acid.

4. A process according to claim 3, wherein the salt is copper(II) formate, acetate, propionate or butyrate.

5. A process according to claim 1, wherein the alcohol $R_2OH$ is a primary or secondary aliphatic alcohol.

6. A process according to claim 1, wherein the oxidizing oxide is selected from the group consisting of silver oxide, lead(IV) oxide, minium, vanadium(V) oxide, manganese(IV) oxide and chromium(VI) oxide.

7. A process according to claim 1, wherein the cyanide is sodium or potassium cyanide.

8. A process according to claim 1, wherein the reaction medium further comprises an alkali-neutralizing amount of acid.

9. A process according to claim 8, wherein the copper(II) acid salt is the salt of a lower carboxylic acid and wherein the alcohol R₂OH is a primary or secondary aliphatic alcohol.

10. A process for the production of pregnanoic acid derivatives of the formula

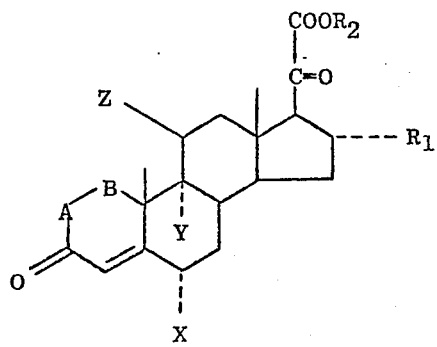

wherein —A—B— is —CH₂—CH₂—, —CH=CH—, or —CCl=CH; X is hydrogen, halogen or methyl; Y is hydrogen or halogen; Z is hydroxy or a halogen having an atomic weight the same as or lower than Y; R₁ is hydrogen atom or methyl; and R₂ is alkyl of 1–12 carbon atoms, cycloalkyl of 3–12 ring carbon atoms, mono or dicyclic aryl of up to 12 ring carbon atoms, phenylalkyl or alkylphenyl, which comprises oxidizing a steroid aldehyde, hydrate or hemiacetal of the formula

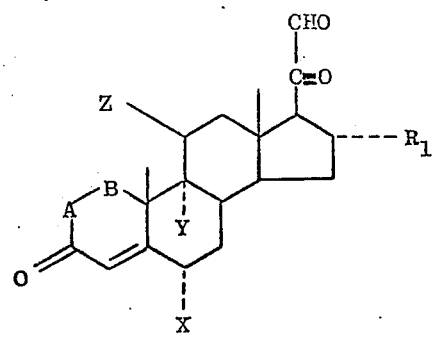

with an oxidizing oxide of a heavy metal of Groups Ia, IIa, IVa, VIb and VIIb in the lower half of the Periodic Table having an oxidation potential of at least + 0.50 in the presence of an alcohol and as catalyst for the oxidation, an alkali metal cyanide to form the corresponding pregnanoic acid derivative.

11. A process according to claim 8 wherein the copper(II) salt is copper(II) formate, acetate, propionate or butyrate, wherein the alcohol R₂OH is a primary or secondary aliphatic alcohol, wherein the oxidizing oxide is selected from the group consisting of silver oxide, lead(IV) oxide, minium, vanadium(V) oxide, manganese(IV) oxide and chromium(VI) oxide, and wherein the cyanide is sodium or potassium cyanide.

12. A process according to claim 10 wherein the salt is copper(II) formate, acetate, propionate or butyrate.

13. A process according to claim 10 wherein the alcohol is a primary or secondary aliphatic alcohol.

14. A process according to claim 10, wherein the oxidizing oxide is selected from the group consisting of silver oxide, lead(IV) oxide, minium, vanadium(V) oxide, manganese(IV) oxide and chromium (VI) oxide.

15. A process according to claim 10 wherein the cyanide is sodium or potassium.

16. A process according to claim 10, wherein the reaction medium further comprises an alkali-neutralizing amount of acid.

17. A process according to claim 10, wherein the copper(II) salt is copper(II) formate, acetate, propionate or butyrate, wherein the alcohol R₂OH is a primary or secondary aliphatic alcohol, wherein the oxidizing oxide is selected from the group consisting of silver oxide, lead(IV) oxide, minium, vanadium(V) oxide, manganese(IV) oxide and chromium(VI) oxide, and wherein the cyanide is sodium or potassium cyanide.

* * * * *